(12) United States Patent
Takikawa et al.

(10) Patent No.: US 10,072,726 B2
(45) Date of Patent: Sep. 11, 2018

(54) DAMPER DEVICE

(71) Applicant: AISIN AW CO., LTD., Anjo-shi, Aichi-ken (JP)

(72) Inventors: Yoshihiro Takikawa, Tsushima (JP); Yoichi Oi, Ama (JP); Hiroki Nagai, Anjo (JP); Kazuhiro Itou, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 15/322,941

(22) PCT Filed: Aug. 5, 2015

(86) PCT No.: PCT/JP2015/072297
§ 371 (c)(1),
(2) Date: Dec. 29, 2016

(87) PCT Pub. No.: WO2016/021669
PCT Pub. Date: Feb. 11, 2016

(65) Prior Publication Data
US 2017/0138436 A1    May 18, 2017

(30) Foreign Application Priority Data
Aug. 5, 2014  (JP) ................... 2014-159662

(51) Int. Cl.
*F16F 15/134* (2006.01)
*F16H 45/02* (2006.01)
*F16D 13/70* (2006.01)

(52) U.S. Cl.
CPC ....... *F16F 15/13484* (2013.01); *F16H 45/02* (2013.01); *F16H 2045/0205* (2013.01);
(Continued)

(58) Field of Classification Search
None
See application file for complete search history.

(56) References Cited

U.S. PATENT DOCUMENTS

2004/0226794 A1    11/2004  Sasse et al.
2009/0107790 A1*    4/2009  Degler ............ F16F 15/12366
                                                            192/3.29
(Continued)

FOREIGN PATENT DOCUMENTS

JP    H07-180744 A    7/1995
JP    2000-154863 A    6/2000
(Continued)

OTHER PUBLICATIONS

Oct. 27, 2015 International Search Report issued in International Patent Application No. PCT/JP2015/072297.

*Primary Examiner* — Mark A Manley
(74) *Attorney, Agent, or Firm* — Oliff PLC

(57) ABSTRACT

A damper device including an input to which power from an internal combustion engine is transmitted and an output, the damper device including: a first torque transmission path including a first elastic body that transmits torque between the input and the output; and a second torque transmission path disposed in parallel with the first torque transmission path and including an intermediate element, a second elastic body that transmits the torque between the input and the intermediate element, and a third elastic body that transmits the torque between the intermediate element and the output, wherein the second and third elastic bodies are placed outside the first elastic body in a radial direction of the damper device so as to be arranged side by side in a circumferential direction of the damper device.

12 Claims, 4 Drawing Sheets

(52) U.S. Cl.
CPC ............ *F16H 2045/0221* (2013.01); *F16H 2045/0226* (2013.01); *F16H 2045/0278* (2013.01); *H05K 999/99* (2013.01)

(56) References Cited

U.S. PATENT DOCUMENTS

| | | | |
|---|---|---|---|
| 2010/0133063 A1 | 6/2010 | Degler | |
| 2011/0247322 A1* | 10/2011 | Lindemann | ......... F16F 15/1343 60/338 |
| 2011/0287844 A1 | 11/2011 | Steinberger | |
| 2013/0048459 A1* | 2/2013 | Matsuoka | ............... F16H 45/02 192/55.6 |
| 2017/0159746 A1* | 6/2017 | Takikawa | .......... F16F 15/13484 |

FOREIGN PATENT DOCUMENTS

| | | |
|---|---|---|
| JP | 2004-308904 A | 11/2004 |
| JP | 2006-118534 A | 5/2006 |
| JP | 2009-507194 A | 2/2009 |
| JP | 2010-535312 A | 11/2010 |
| JP | 2011-158015 A | 8/2011 |
| JP | 2011-214635 A | 10/2011 |
| JP | 2011-252583 A | 12/2011 |
| JP | 2012-506004 A | 3/2012 |
| JP | 2012-077823 A | 4/2012 |
| JP | 2012-077826 A | 4/2012 |
| JP | 2013-119897 A | 6/2013 |

\* cited by examiner

DAMPER DEVICE

BACKGROUND

The present disclosure relates to damper devices including an input element to which power from an internal combustion engine is transmitted, and an output element.

Conventionally, a double path damper that is used in association with a torque converter is known as this type of damper devices (see, e.g., JP 2012-506006 A). In this damper device, a vibration path from an engine and a lockup clutch to an output hub is divided into two parallel vibration paths B, C, and each of the two vibration paths B, C includes a pair of springs and a separate intermediate flange placed between the pair of springs. A turbine of a torque converter is connected to the intermediate flange of the vibration path B so that the resonant frequency varies between the two vibration paths. The natural frequency of the intermediate flange in the vibration path B is lower than that of the intermediate flange in the vibration path C. When the lockup clutch is engaged, engine vibration enters the two vibration paths B, C of the damper device. When the engine vibration having a certain frequency reaches the vibration path B including the intermediate flange connected to the turbine, the phase of the vibration from the intermediate flange to the output hub in the vibration path B is shifted by 180 degrees with respect to that of the input vibration. Since the natural frequency of the intermediate flange in the vibration path C is higher than that of the intermediate flange in the vibration path B, the vibration having entered the vibration path C is transmitted to the output hub without any phase shift. The vibration transmitted to the output hub through the vibration path B is thus 180 degrees out of phase with respect to that transmitted to the output hub through the vibration path C, whereby damped vibration can be obtained at the output hub.

SUMMARY

In the double path damper described in JP 2012-506006 A, the two intermediate flanges (36, 38) are placed so as to face each other in the axial direction of the double path damper (see FIGS. 5A and 5B in JP 2012-506006 A). The pair of springs (35a, 35b) forming the vibration path B are therefore placed so as to be located side by side in the radial direction of the double path damper, and the pair of springs (37a, 37b) forming the vibration path C are also placed so as to be located side by side in the radial direction of the double path damper. That is, the input-side springs (35a, 37a) of the vibration paths B, C are located radially outside the output-side springs (35b, 37b) of the vibration paths B, C. In the double path damper of JP 2012-506006 A, flexibility in setting the natural frequencies of the vibration paths B, C by adjusting the rigidity (spring constant) of each spring and the weight (moment of inertia) of the intermediate flanges is reduced, which may make it difficult to improve vibration damping capability. Moreover, in the double path damper of JP 2012-506006 A, resonant frequencies of the vibration paths B, C become close to each other, whereby sufficient vibration damping may not be achieved.

An exemplary aspect of the present disclosure improves vibration damping capability of a damper device having first and second torque transmission paths that are disposed in parallel.

A damper device of the present disclosure is a damper device including an input to which power from an internal combustion engine is transmitted and an output, the damper device including: a first torque transmission path including a first elastic body that transmits torque between the input and the output; and a second torque transmission path disposed in parallel with the first torque transmission path and including an intermediate element, a second elastic body that transmits the torque between the input and the intermediate element, and a third elastic body that transmits the torque between the intermediate element and the output, wherein the second and third elastic bodies are placed outside the first elastic body in a radial direction of the damper device so as to be arranged side by side in a circumferential direction of the damper device.

In the damper device having such first and second torque transmission paths, an anti-resonance point can be set at which a vibration amplitude of the output becomes theoretically zero when vibration transmitted to the output through the first torque transmission path becomes 180 degrees out of phase with respect to that transmitted to the output through the second torque transmission path due to occurrence of resonance corresponding to a natural frequency of the second torque transmission path (the intermediate element). Moreover, in this damper device, the intermediate element, or a resonating element, is omitted from the first torque transmission path. This can further increase a frequency band (engine speed range) in which one of the vibration transmitted to the output through the first elastic body and the vibration transmitted to the output through the third elastic body cancels at least a part of the other after the resonance corresponding to the natural frequency of the second torque transmission path (the intermediate element) occurs. Since the second and third elastic bodies of the second torque transmission path are placed outside the first elastic body of the first torque transmission path in the radial direction of the damper device, the natural frequency of the second torque transmission path (the intermediate element) can further be reduced by adjusting rigidity of the second and third elastic bodies and a moment of inertia of the intermediate element. This can further improve vibration damping capability of the damper device having the first and second torque transmission paths disposed in parallel. Moreover, in this damper device, the intermediate element is omitted from the first torque transmission path. This can simplify the overall structure of the device and can restrain an increase in overall size (especially an increase in overall axial length) of the device.

Another damper device of the present disclosure is a damper device including an input to which power from an internal combustion engine is transmitted and an output. The damper device includes: a first torque transmission path including a first elastic body that transmits torque between the input and the output; and a second torque transmission path disposed in parallel with the first torque transmission path and including an intermediate element, a second elastic body that transmits the torque between the input and the intermediate element, and a third elastic body that transmits the torque between the intermediate element and the output. Spring constants of the first, second, and third elastic bodies and a moment of inertia of the intermediate element are determined based on a frequency at an anti-resonance point at which a vibration amplitude of the output element is theoretically zero.

Since the damper device is thus configured based on the frequency at the anti-resonance point at which the vibration amplitude of the output element can further be reduced, vibration damping capability of the damper device having the first and second torque transmission paths disposed in parallel can further be improved.

DETAILED DESCRIPTION OF EMBODIMENTS

Modes for carrying out the disclosure of the present disclosure will be described below with reference to the accompanying drawings.

Figure 1:
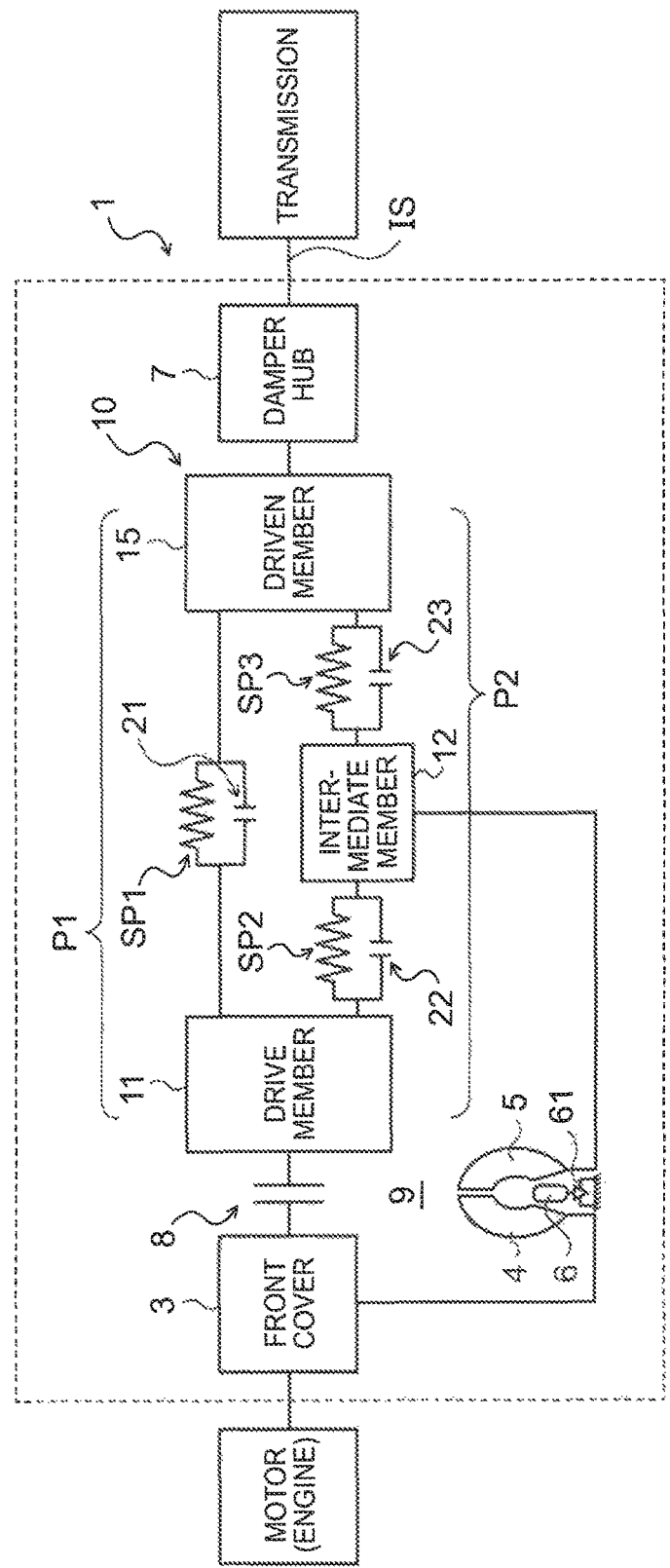
FIG. 1 is a schematic configuration diagram showing a starting device including a damper device according to an embodiment of the present disclosure.
Figure 2:
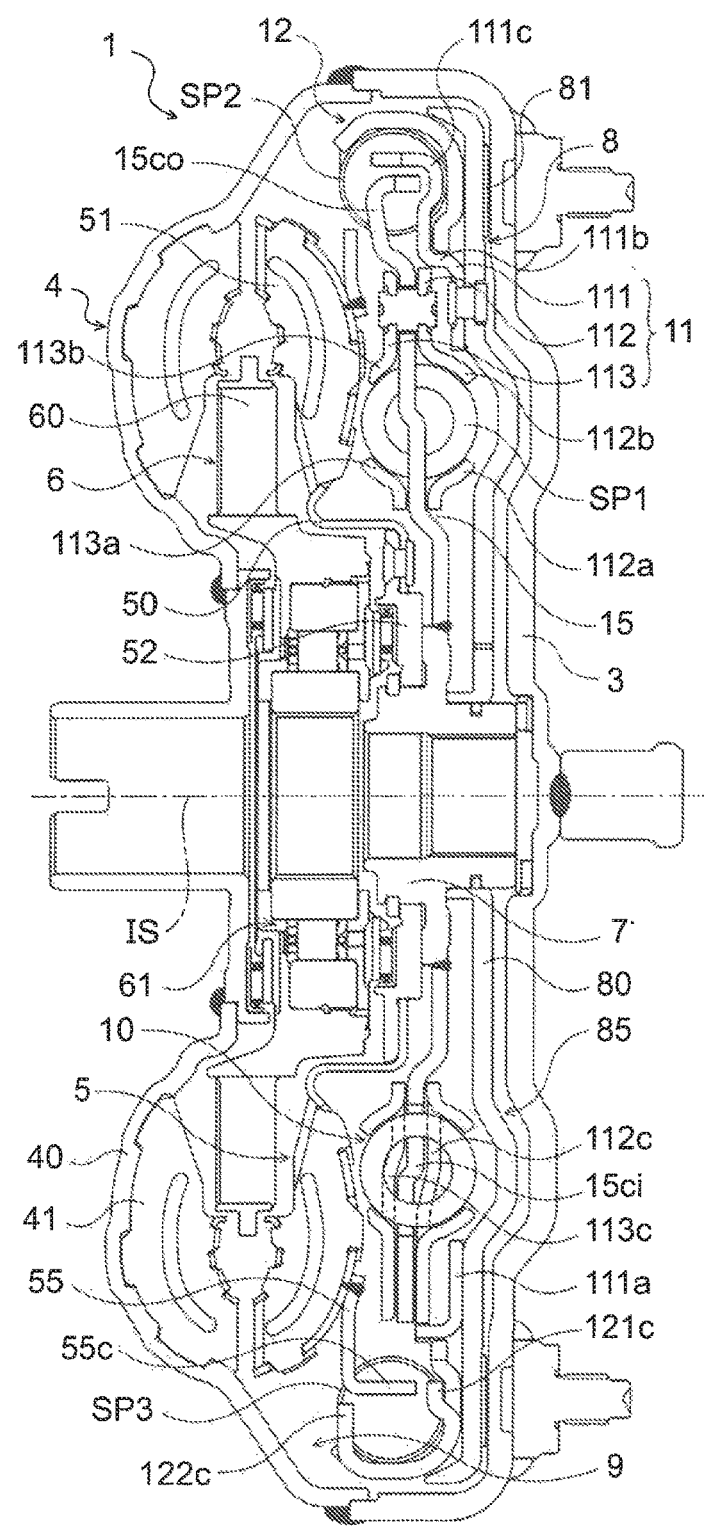
FIG. 2 is a sectional view showing the starting device of FIG. 1.

FIG. 1 is a schematic configuration diagram showing a starting device 1 including a damper device 10 according to an embodiment of the present disclosure, and FIG. 2 is a sectional view showing the starting device 1. The starting device 1 shown in these figures is mounted on a vehicle including an engine (internal combustion engine) serving as a motor. The starting device 1 includes, in addition to the damper device 10, a front cover 3 serving as an input member (input) that is coupled to a crankshaft of the engine, a pump impeller (input-side hydraulic transmission element) 4 that is fixed to the front cover 3, a turbine runner (output-side hydraulic transmission element) 5 that can rotate coaxially with the pump impeller 4, a damper hub 7 serving as a power output member that is coupled to the damper device 10 and that is fixed to an input shaft IS of a transmission, which is an automatic transmission (AT) or a continuously variable transmission (CVT), a lockup clutch 8, etc.

In the following description, the "axial direction" basically refers to the direction in which the central axis (axis) of the starting device 1 or the damper device 10 extends, unless otherwise specified. The "radial direction" basically refers to the radial direction of the starting device 1, the damper device 10, or rotary elements of the damper device 10 etc., namely a linear direction extending from and perpendicularly to (in the direction of the radius) the central axis of the starting device 1 or the damper device 10, unless otherwise specified. The "circumferential direction" basically refers to the circumferential direction of the starting device 1, the damper device 10, or the rotary elements of the damper device 10 etc., namely the direction along the rotation direction of the rotary elements, unless otherwise specified.

As shown in FIG. 2, the pump impeller 4 has a pump shell 40 firmly fixed to the front cover 3, and a plurality of pump blades 41 disposed on the inner surface of the pump shell 40. As shown in FIG. 2, the turbine runner 5 has a turbine shell 50 and a plurality of turbine blades 51 disposed on the inner surface of the turbine shell 50. An inner peripheral part of the turbine shell 50 is fixed to a turbine hub 52 via a plurality of rivets. The turbine hub 52 is rotatably supported by the damper hub 7, and movement of the turbine hub 52 (turbine runner 5) in the axial direction of the starting device 1 is restricted by the damper hub 7 and a snap ring mounted on the damper hub 7.

The pump impeller 4 and the turbine runner 5 face each other, and a stator 6 that adjusts the flow of hydraulic oil (working fluid) from the turbine runner 5 to the pump impeller 4 is coaxially placed between the pump impeller 4 and the turbine runner 5. The stator 6 has a plurality of stator blades 60, and the stator 6 is rotated only in one direction by a one-way clutch 61. The pump impeller 4, the turbine runner 5, and the stator 6 form a torus (annular flow path) in which hydraulic oil is circulated, and function as a torque converter (hydraulic transmission device) having a function to amplify torque. In the starting device 1, the stator 6 and the one-way clutch 61 may be omitted, and the pump impeller 4 and the turbine runner 5 may function as a fluid coupling.

The lockup clutch 8 performs a lockup operation, or an operation of coupling the front cover 3 to the damper hub 7 via the damper device 10, and an operation of releasing the lockup coupling. In the present embodiment, the lockup clutch 8 is a single-plate hydraulic clutch and has a lockup piston (power input member/power input) 80 that is placed inside the front cover 3 at a position near the inner wall surface on the engine side of the front cover 3 and that is fitted on the damper hub 7 so as to be movable in the axial direction. As shown in FIG. 2, a friction material 81 is bonded to an outer peripheral part of the surface of the lockup piston 80 which faces the front cover 3. A lockup chamber 85 that is connected to a hydraulic control device, not shown, via a hydraulic oil supply passage and an oil passage formed in the input shaft IS is defined between the lockup piston 80 and the front cover 3.

Hydraulic oil that is supplied from the hydraulic control device to the pump impeller 4 and the turbine runner 5 (torus) in the radially outward direction from the axis side of the pump impeller 4 and the turbine runner 5 (from the vicinity of the one-way clutch 61) via the oil passage formed in the input shaft IS etc. can flow into the lockup chamber 85. Accordingly, if the pressure in a hydraulic transmission chamber 9 defined by the front cover 3 and the pump shell of the pump impeller 4 and the pressure in the lockup chamber 85 are kept equal to each other, the lockup piston 80 does not move toward the front cover 3 and the lockup piston 80 does not frictionally engage with the front cover 3. On the other hand, if the pressure in the lockup chamber 85 is reduced by the hydraulic control device, not shown, the lockup piston 80 moves toward the front cover 3 due to the pressure difference and frictionally engages with the front cover 3. The front cover 3 (engine) is thus coupled to the damper hub 7 via the damper device 10. The lockup clutch 8 may be a multi-plate hydraulic clutch including at least one friction engagement plate (a plurality of friction materials).

As shown in FIGS. 1 and 2, the damper device 10 includes, as the rotary elements, a drive member (input element) 11, an intermediate member (intermediate element) 12, and a driven member (output element/output) 15. The damper device 10 further includes, as torque transmission elements (torque transmission elastic bodies), a plurality of (e.g., four in the present embodiment) first springs (first elastic bodies) SP1 that transmit torque between the drive member 11 and the driven member 15, a plurality of (e.g., three in the present embodiment) second springs (second elastic bodies) SP2 that transmit torque between the drive member 11 and the intermediate member 12, and a plurality of (e.g., three in the present embodiment) third springs (third elastic bodies) SP3 that transmit torque between the intermediate member 12 and the driven member 15.

That is, as shown in FIG. 1, the damper device 10 has a first torque transmission path P1 and a second torque transmission path P2 which are disposed in parallel. The first torque transmission path P1 includes only the first springs SP1 as elements placed between the drive member 11 and the driven member 15, and transmits torque between the drive member 11 and the driven member 15 via the plurality of first springs SP1. The second torque transmission path P2 includes, as elements placed between the drive member 11 and the driven member 15, the intermediate member 12 and the second and third springs SP2, SP3, and transmits torque between the drive member 11 and the driven member 15 via the plurality of second springs SP2, the intermediate member 12, and the plurality of third springs SP3.

In the present embodiment, the first to third springs SP1 to SP3 are linear coil springs each made of a metal material wound in a helical shape so as to have an axis extending straight when not subjected to a load. As compared to the case where the first to third springs SP1 to SP3 are arc coil springs, the first to third springs SP1 to SP3 can be more properly extended and contracted along their axes, and what is called hysteresis (the difference between torque that is output from the driven member 15 when input torque to the drive member 11 increases and torque that is output from the driven member 15 when the input torque decreases) can be reduced. As shown in FIG. 2, in the present embodiment, the first springs SP1 have a larger outside diameter (coil diameter) than the second and third springs SP2, SP3. As shown in FIG. 2, the wire diameter (outside diameter of the coil wire) of the first springs SP1 is larger than that of the second and third springs SP2, SP3.

As shown in FIG. 2, the drive member 11 of the damper device 10 includes an annular first plate member (first input member/first input) 111 fixed to the lockup piston 80 of the lockup clutch 8, an annular second plate member (second input member/second input) 112 coupled to the first plate member 111 so as to rotate therewith, and an annular third plate member (third input member/third input) 113 placed near the turbine runner 5 and coupled (fixed) to the second plate member 112 via a plurality of rivets. The drive member 11, namely the first to third plate members 111 to 113, thus rotate with the lockup piston 80, and the front cover 3 (engine) is coupled to the drive member 11 of the damper device 10 by engagement of the lockup clutch 8.

The first plate member 111 has an annular fixed portion 111a fixed to an outer peripheral part of the inner surface (surface to which the friction material 81 is not bonded) of the lockup piston 80 via a plurality of rivets, a tubular portion 111b extending in the axial direction from the outer periphery of the fixed portion 111a, and a plurality of (e.g., three in the present embodiment) spring contact portions (outer contact portions/outer contact) 111c extended radially outward from the tubular portion 111b at intervals (regular intervals) in the circumferential direction. The tubular portion 111b of the first plate member 111 has in its free end a plurality of engagement projections each fitted in a corresponding one of recesses formed in an outer peripheral part of the second plate member 112.

The second plate member 112 has a plurality of (e.g., four in the present embodiment) spring support portions 112a disposed at intervals (regular intervals) in the circumferential direction along the inner peripheral edge of the second plate member 112, a plurality of (e.g., four in the present embodiment) spring support portions 112b disposed radially outside the plurality of spring support portions 112a at intervals (regular intervals) in the circumferential direction and each facing a corresponding one of the spring support portions 112a in the radial direction of the second plate member 112, and a plurality of (e.g., four in the present embodiment) spring contact portions (inner contact portions/inner contact) 112c. The third plate member 113 has a plurality of (e.g., four in the present embodiment) spring support portions 113a disposed at intervals (regular intervals) in the circumferential direction along the inner peripheral edge of the third plate member 113, a plurality of (e.g., four in the present embodiment) spring support portions 113b disposed radially outside the plurality of spring support portions 113a at intervals (regular intervals) in the circumferential direction and each facing a corresponding one of the spring support portions 113a in the radial direction of the third plate member 113, and a plurality of (e.g., four in the present embodiment) spring contact portions (inner contact portions/inner contact) 113c.

Each of the plurality of spring support portions 112a of the second plate member 112 supports (guides) the lockup piston 80 side of a corresponding one of the first springs SP1 (one first spring SP1 each) from the inner peripheral side. Each of the plurality of spring support portions 112b supports (guides) the lockup piston 80 side of a corresponding one of the first springs SP1 (one first spring SP1 each) from the outer peripheral side. Each of the plurality of spring support portions 113a of the third plate member 113 supports (guides) the turbine runner 5 side of a corresponding one of the first springs SP1 (one first spring SP1 each) from the inner peripheral side. Each of the plurality of spring support portions 113b supports (guides) the turbine runner 5 side of a corresponding one of the first springs SP1 (one first spring SP1 each) from the outer peripheral side. The plurality of first springs SP1 are thus supported by the second plate member 112 and the third plate member 113 so as to be arranged side by side in the circumferential direction of the second plate member 112 and the third plate member 113 (the damper device 10).

The plurality of spring contact portions 112c of the second plate member 112 are disposed such that one spring contact portion 112c is located between every two sets of the spring support portions 112a, 112b, the sets adjoining each other in the circumferential direction. When the damper device 10 is in a mounted state, each spring contact portion 112c is located between adjoining ones of the first springs SP1 supported by the second and third plate members 112, 113 and contacts the ends of these adjoining first springs SP1. The plurality of spring contact portions 113c of the third plate member 113 are disposed such that one spring contact portion 113c is located between every two sets of the spring support portions 113a, 113b, the sets adjoining each other in the circumferential direction. When the damper device 10 is in the mounted state, each spring contact portion 113c is also located between adjoining ones of the first springs SP1 supported by the second and third plate members 112, 113 and contacts the ends of these adjoining first springs SP1.

The intermediate member 12 is formed in an annular shape so as to support (guide) the outer peripheral parts and the lockup piston 80 sides (the right sides in FIG. 2) of the plurality of second and third springs SP2, SP3 etc. As shown in FIG. 2, the intermediate member 12 is rotatably supported (aligned) by the tubular portion (support portion/support) 111b of the first plate member 111 of the drive member 11 and is placed in an outer peripheral region of the hydraulic transmission chamber 9. Since the intermediate member 12 is thus placed in the outer peripheral region of the hydraulic transmission chamber 9 so as to be located near the outer periphery of the damper device 10, the moment of inertia (inertia) of the intermediate member 12 can further be increased.

The intermediate member 12 also supports the second and third springs SP2, SP3 such that the second and third springs SP2, SP3 are alternately arranged side by side in the circumferential direction of the intermediate member 12 (the damper device 10). The second and third springs SP2, SP3 are thus placed radially outside the plurality of first springs SP1 supported by the drive member 11 (the second and third plate members 112, 113). Since the second and third springs SP2, SP3 are thus placed in the outer peripheral region of the hydraulic transmission chamber 9 so as to surround the plurality of first springs SP1, the axial length of the damper device 10 and thus the starting device 1 can further be reduced.

The intermediate member 12 has a plurality (e.g., three in the present embodiment) first spring contact portions (elastic body contact portions) 121c and a plurality of (e.g., three in the present embodiment) second spring contact portions (elastic body contact portions) 122c each facing a corresponding one of the first spring contact portions 121c in the axial direction. The first and second spring contact portions 121c, 122c are located between the second and third springs SP2, SP3 that are paired (that operate in series) and contact the ends of these second and third springs SP2, SP3. The spring contact portion 111c of the first plate member 111 of the drive member 11 is placed between the second and third springs SP2, SP3 that are not paired (that do not operate in series).

Namely, when the damper device 10 is in the mounted state, each spring contact portion 111c of the drive member 11 is located between the second and third springs SP2, SP3 that are not paired, and contacts the ends of these second and third springs SP2, SP3. Accordingly, when the damper device 10 is in the mounted state, one end of each second spring SP2 contacts a corresponding one of the spring contact portions 111c of the drive member 11, and the other end of each second spring SP2 contacts a corresponding one of the first spring contact portions 121c and a corresponding one of the second spring contact portions 122c of the intermediate member 12. When the damper device 10 is in the mounted state, one end of each third spring SP3 contacts a corresponding one of the first spring contact portions 121c and a corresponding one of the second spring contact portions 122c of the intermediate member 12, and the other end of each third spring SP3 contacts a corresponding one of the spring contact portions 111c of the drive member 11.

As shown in FIG. 2, the driven member 15 is placed between the second plate member 112 and the third plate member 113 of the drive member 11 in the axial direction and is fixed to the damper hub 7 by, e.g., welding. The driven member 15 has a plurality of (e.g., four in the present embodiment) inner spring contact portions (inner contact portions/inner contact) 15ci formed near the inner peripheral edge of the driven member 15 at intervals in the circumferential direction, and a plurality of (e.g., three in the present embodiment) outer spring contact portions (outer contact portions/outer contact) 15co formed radially outside the plurality of inner spring contact portions 15ci at intervals in the circumferential direction.

When the damper device 10 is in the mounted state, each inner spring contact portion 15ci of the driven member 15 is located between adjoining ones of the first springs SP1 and contacts the ends of the adjoining first springs SP1, like the spring contact portions 112c, 113c of the drive member 11. When the damper device 10 is in the mounted state, each outer spring contact portion 15co of the driven member 15 is located between the second and third springs SP2, SP3 that are not paired, and contacts the ends of these second and third springs SP2, SP3, like the spring contact portions 111c of the drive member 11.

Accordingly, when the damper device 10 is in the mounted state, both ends of each first spring SP1 contact the spring contact portions 112c, 113c of the drive member 11 and the inner spring contact portions 15ci of the driven member 15. Moreover, the one end of each second spring SP2 also contacts a corresponding one of the outer spring contact portions 15co of the driven member 15, and the other end of each third spring SP3 also contacts a corresponding one of the outer spring contact portions 15co of the driven member 15. The driven member 15 is thus coupled to the drive member 11 through the plurality of first springs SP1, namely through the first torque transmission path P1, and is also coupled to the drive member 11 through the plurality of second springs SP2, the intermediate member 12, and the plurality of third springs SP3, namely through the second torque transmission path P2.

As shown in FIG. 2, in the present embodiment, the turbine shell 50 of the turbine runner 5 has an annular turbine coupling member 55 (turbine coupler) fixed thereto by, e.g., welding. The turbine coupling member 55 has a plurality of (e.g., three in the present embodiment) spring contact portions 55c formed at intervals in the circumferential direction in its outer peripheral part so as to extend in the axial direction. Each spring contact portion 55c of the turbine coupling member 55 is located between the second and third springs SP2, SP3 that are paired to operate in series, and contacts the ends of these second and third springs SP2, SP3.

The intermediate member 12 and the turbine runner 5 are thus coupled so as to rotate together. Since the turbine runner 5 (and the turbine hub 52) is coupled to the intermediate member 12, a substantial moment of inertia of the intermediate member 12 (the sum of the moments of inertia of the intermediate member 12, the turbine runner 5, etc.) can further be increased. Since the turbine runner 5 is coupled to the intermediate member 12 placed radially outside the first springs SP1, namely in the outer peripheral region of the hydraulic transmission chamber 9, the turbine coupling member 55 can be prevented from passing between the third plate member 113 of the drive member 11 or the first springs SP1 and the turbine runner 5 in the axial direction. An increase in axial length of the damper device 10 and thus the starting device 1 can thus be satisfactorily restrained.

As shown in FIG. 1, the damper device 10 further includes a first stopper 21 that restricts deflection of the first springs SP1, a second stopper 22 that restricts deflection of the second springs SP2, and a third stopper 23 that restricts deflection of the third springs SP3. In the present embodiment, the first stopper 21 restricts relative rotation between the drive member 11 and the driven member 15. The second stopper 22 restricts relative rotation between the drive member 11 and the intermediate member 12. The third stopper 23 restricts relative rotation between the intermediate member 12 and the driven member 15. Each of the first to third stoppers 21 to 23 restricts deflection of the springs associated therewith from the time when the input torque to the drive member 11 reaches predetermined torque (first threshold) T1 smaller than torque T2 (second threshold) corresponding to a maximum torsion angle θmax of the damper device 10.

In the present embodiment, one of the second and third stoppers 22, 23 which corresponds to either the second springs SP2 or the third springs SP3 which have a smaller spring constant (e.g., the second springs SP2) restricts deflection of the associated springs when the input torque to the drive member 11 reaches the torque T1. The first stopper 21 and the other of the second and third stoppers 22, 23 operate at the same time when the input torque to the drive member 11 reaches the torque T2 corresponding to the maximum torsion angle θmax. The damper device 10 thus has two-stage damping characteristics. The configurations of the first to third stoppers 21 to 23 are not limited to the illustrated configurations, and one of the first stopper 21 and the other of the second and third stoppers 22, 23 may be omitted.

As can be seen from FIG. 1, with the lockup coupling being released by the lockup clutch 8 of the starting device 1 configured as described above, torque (power) transmitted from the engine to the front cover 3 is transmitted to the input shaft IS of the transmission through a path formed by the pump impeller 4, the turbine runner 5, the intermediate member 12, the third springs SP3, the driven member 15, and the damper hub 7. On the other hand, with the lockup operation being performed by the lockup clutch 8 of the starting device 1, torque transmitted from the engine to the drive member 11 via the front cover 3 and the lockup clutch 8 is transmitted to the driven member 15 and the damper hub 7 through the first torque transmission path P1 including (only) the plurality of first springs SP1 and the second torque transmission path P2 including the plurality of second springs SP2, the intermediate member 12, and the plurality of third springs SP3. The first springs SP1 and the second and third springs SP2, SP3 operate in parallel to damp (absorb) torque fluctuation transmitted to the drive member 11, until the input torque to the drive member 11 reaches the torque T1. When the input torque to the drive member 11 becomes larger than the torque T1, the first springs SP1 and the second or third springs SP2, SP3 operate in parallel to damp (absorb) the torque fluctuation transmitted to the drive member 11.

The design procedure of the damper device 10 will be described below.

As described above, in the damper device 10, the first springs SP1 and the second and third springs SP2, SP3 operate in parallel until the input torque transmitted to the drive member 11 reaches the torque T1. When the first springs SP1 and the second and third springs SP2, SP3 operate in parallel, resonance of the intermediate member 12 or resonance mainly due to vibration of the entire damper device 10 and a drive shaft of the vehicle occurs in one of the first and second torque transmission paths P1, P2 according to the frequency of vibration transmitted from the engine to the drive member 11. Once resonance occurs in one of the first and second torque transmission paths P1, P2 according to the frequency of vibration transmitted to the drive member 11, vibration transmitted from the drive member 11 to the driven member 15 through the first torque transmission path P1 (primary path) becomes 180 degrees out of phase with respect to that transmitted from the drive member 11 to the driven member 15 through the second torque transmission path P2 (secondary path). The damper device 10 can thus damp the vibration at the driven member 15 by using the phase shift of the vibration between the first and second torque transmission paths P1, P2.

The inventors carried out intensive research and analysis in order to further improve vibration damping capability of the damper device 10 having such characteristics, and obtained an equation of motion as given by the following expression (1) for a vibration system including the damper device 10 with torque being transmitted from the engine to the drive member 11 by the lockup operation. In the expression (1), "$J_1$" represents the moment of inertia of the drive member 11, "$J_2$" represents the moment of inertia of the intermediate member 12, "$J_3$" represents the moment of inertia of the driven member 15, "$\theta_1$" represents the torsion angle of the drive member 11, "$\theta_2$" represents the torsion angle of the intermediate member 12, "$\theta_3$" represents the torsion angle of the driven member 15, "$k_1$" represents the combined spring constant of the plurality of first springs SP1 that operate in parallel between the drive member 11 and the driven member 15, "$k_2$" represents the combined spring constant of the plurality of second springs SP2 that operate in parallel between the drive member 11 and the intermediate member 12, "$k_3$" represents the combined spring constant of the plurality of third springs SP3 that operate in parallel between the intermediate member 12 and the driven member 15, "$k_R$" represents the rigidity, namely the spring constant, of the transmission, the drive shaft, etc. that are disposed between the driven member 15 and wheels of the vehicle, and "T" represents the input torque that is transmitted from the engine to the drive member 11.

[Formula 1]

$$\begin{pmatrix} J_1 & 0 & 0 \\ 0 & J_2 & 0 \\ 0 & 0 & J_3 \end{pmatrix} \begin{pmatrix} \ddot{\theta}_1 \\ \ddot{\theta}_2 \\ \ddot{\theta}_3 \end{pmatrix} + \begin{pmatrix} k_1+k_2 & -k_2 & -k_1 \\ -k_2 & k_2+k_3 & -k_3 \\ -k_1 & -k_3 & k_1+k_3+k_R \end{pmatrix} \begin{pmatrix} \theta_1 \\ \theta_2 \\ \theta_3 \end{pmatrix} = \begin{pmatrix} T \\ 0 \\ 0 \end{pmatrix} \quad (1)$$

The inventors also assumed that the input torque T vibrates periodically as given by the following expression (2) and that the torsion angle $\theta_1$ of the drive member 11, the torsion angle $\theta_2$ of the intermediate member 12, and the torsion angle $\theta_3$ of the driven member 15 responds (vibrates) periodically as given by the following expression (3). In the expressions (2), (3), "$\omega$" represents the angular frequency of periodic fluctuation (vibration) of the input torque T. In the expression (3), "$\Theta_1$" represents the amplitude of vibration (vibration amplitude, i.e., the maximum torsion angle) of the drive member 11 which occurs as the torque from the engine is transmitted thereto, "$\Theta_2$" represents the amplitude of vibration (vibration amplitude) of the intermediate member 12 which occurs as the torque from the engine is transmitted to the drive member 11, and "$\Theta_3$" represents the amplitude of vibration (vibration amplitude) of the driven member 15 which occurs as the torque from the engine is transmitted to the drive member 11. Under the above assumption, an identity as given by the following expression (4) can be obtained by substituting the expressions (2), (3) for the expression (1) and eliminating "sin $\omega t$" from both sides.

[Formula 2]

$$T = T_0 \sin\omega t \quad (2)$$

$$\begin{bmatrix} \theta_1 \\ \theta_2 \\ \theta_3 \end{bmatrix} = \begin{bmatrix} \Theta_1 \\ \Theta_2 \\ \Theta_3 \end{bmatrix} \sin\omega t \quad (3)$$

$$\begin{pmatrix} -\omega^2 J_1 + k_1 + k_2 & -k_2 & -k_1 \\ -k_2 & -\omega^2 J_2 + k_2 + k_3 & -k_3 \\ -k_1 & -k_3 & -\omega^2 J_3 + k_1 + k_3 + k_R \end{pmatrix} \begin{pmatrix} \Theta_1 \\ \Theta_2 \\ \Theta_3 \end{pmatrix} = \begin{pmatrix} T_0 \\ 0 \\ 0 \end{pmatrix} \quad (4)$$

The inventors looked at the fact that when the vibration amplitude $\Theta_3$ of the driven member 15 in the expression (4) is zero, vibration from the engine is theoretically completely damped by the damper device 10 and vibration is theoretically not transmitted to the transmission, the drive shaft, etc. that are located in the stages after the driven member 15. In view of this, the inventors solved the identity as given by the expression (4) for the vibration amplitude $\Theta_3$, and obtained a conditional expression as given by the following expression (5) by setting $\Theta_3=0$. In the case where the relationship of the expression (5) is satisfied, vibration from the engine transmitted from the drive member 11 to the driven member 15 through the first torque transmission path P1 and vibration transmitted from the drive member 11 to the driven member 15 through the second torque transmission path P2 cancel each other, and the vibration amplitude $\Theta_3$ of the driven member 15 becomes theoretically equal to zero. It should be understood from this analysis result that, in the damper device 10 having the above configuration, an anti-resonance point A can be set at which the vibration amplitude $\Theta_3$ of the driven member 15 becomes theoretically zero when vibration transmitted to the driven member 15 through the first torque transmission path P1 becomes 180 degrees out of phase with respect to that transmitted to the driven member 15 through the second torque transmission path P2 due to occurrence of resonance.

[Formula 3]

$$\omega^2 = \frac{k_1 k_2 + k_1 k_3 + k_2 k_3}{k_1 J_2} \quad (5)$$

In the vehicle having the engine mounted thereon as a source of power for driving the vehicle, the lockup engine speed Nlup of the lockup clutch is reduced to promptly mechanically transmit torque from the engine to the transmission, whereby power transmission efficiency between the engine and the transmission can be improved and thus fuel economy of the engine can be improved. However, in the low engine speed range of about 500 rpm to 1,500 rpm which can be the range in which the lockup engine speed Nlup is set, larger vibration is transmitted from the engine to the drive member 11 via the lockup clutch, and an increase in vibration level is significant especially in vehicles having mounted thereon an engine with a smaller number of cylinders such as a three-cylinder or four-cylinder engine. Accordingly, in order for large vibration not to be transmitted to the transmission etc. when and immediately after the lockup operation is performed, it is necessary to further reduce the vibration level in an engine speed range near the lockup engine speed Nlup of the entire damper device 10 (the driven member 15) that transmits torque (vibration) from the engine to the transmission with the lockup operation being performed.

In view of this, the inventors configured the damper device 10 so that the above anti-resonance point A was formed when the engine speed was in the range of 500 rpm to 1,500 rpm (the expected range in which the lockup engine speed Nlup is set), based on the lockup engine speed Nlup determined for the lockup clutch 8. The frequency fa at the anti-resonance point A is given by the following expression (6) by substituting "$2\pi fa$" for $\omega$ in the above expression (5), where "fa" represents the frequency at the anti-resonance point A. The engine speed Nea corresponding to the frequency fa is given by Nea=(120/n)·fa, where "n" represents the number of cylinders of the engine. Accordingly, in the damper device 10, the combined spring constant $k_1$ of the plurality of first springs SP1, the combined spring constant $k_2$ of the plurality of second springs SP2, the combined spring constant $k_3$ of the plurality of third springs SP3, and the moment of inertia $J_2$ of the intermediate member 12 (the moment of inertia of the turbine runner etc. coupled to the intermediate member 12 so as to rotate therewith is also taken into account (the sum of the moments of inertia of the intermediate member 12, the turbine runner, etc.)) are selected and set so as to satisfy the following expression (7). That is, in the damper device 10, the spring constants $k_1$, $k_2$, $k_3$ of the first, second, and third springs SP1 to SP3 and the moment of inertia $J_2$ of the intermediate member 12 are determined based on the frequency fa at the anti-resonance point A (and the lockup engine speed Nlup).

[Formula 4]

$$fa = \frac{1}{2\pi}\sqrt{\frac{k_1 k_2 + k_1 k_3 + k_2 k_3}{k_1 J_2}} \quad (6)$$

$$500 \; rpm \leq \frac{120}{n} fa \leq 1500 \; rpm \quad (7)$$

Figure 3:
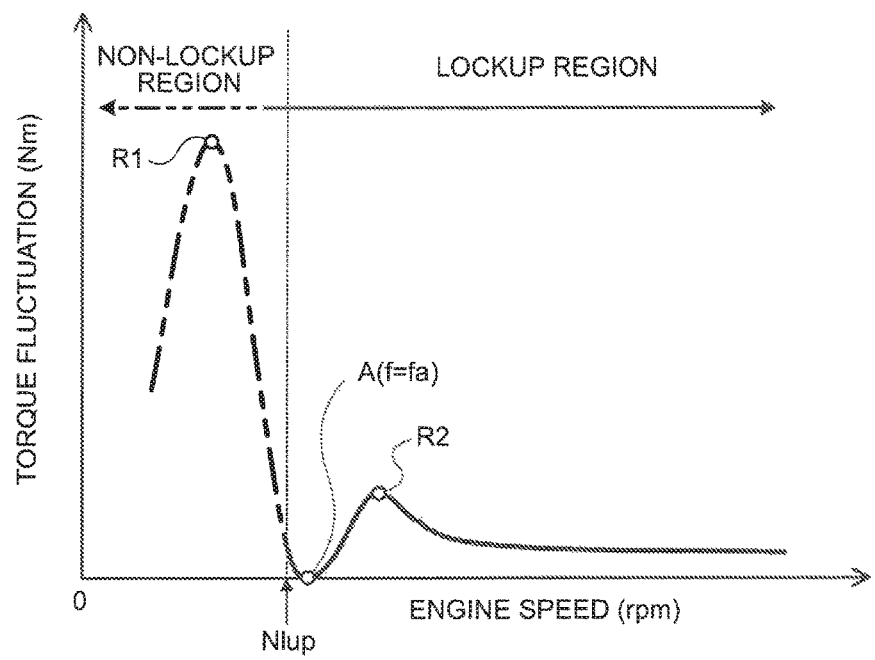
FIG. 3 is an illustration showing the relationship between the engine speed and the torque fluctuation in an output element of the damper device.

The anti-resonance point A at which the vibration amplitude $\Theta_3$ of the driven member 15 can be theoretically zero (can further be reduced) is thus set in the low engine speed range of 500 rpm to 1,500 rpm (the expected range in which the lockup engine speed Nlup is set), whereby the timing the resonance that produces the anti-resonance point A (the resonance that just has to be caused in order to form the anti-resonance point A, see the resonance point R1 in FIG. 3) occurs can be shifted to the lower engine speed side (the lower frequency side) so as to be included in a non-lockup region (see the long dashed double-short dashed line in FIG. 3) of the lockup clutch 8, as shown in FIG. 3. This can restrain an increase in diameter and number of turns (axial length) of the first to third springs SP1 to SP3 and thus an increase in size of the damper device 10 and the starting device 1 and allows the lockup operation (coupling between the engine and the drive member 11) to be performed at a lower engine speed, and can also improve the vibration damping capability of the damper device 10 in the low engine speed range in which vibration from the engine tends to be large.

Moreover, when the damper device 10 is configured so as to satisfy the expression (7), it is preferable to select and set the spring constants $k_1$, $k_2$, $k_3$ and the moment of inertia $J_2$ of the intermediate member 12 so that the frequency of the resonance that produces the anti-resonance point A is lower than the frequency fa at the anti-resonance point A and is as low as possible. This can further reduce the frequency fa at the anti-resonance point and allows the lockup operation to be performed at a much lower engine speed. In the case where the resonance that produces the anti-resonance point A is the resonance caused by vibration of the intermediate member 12, the frequency $f_{R1}$ of this resonance (resonance point R1) (the natural frequency of the second torque transmission path P2, namely the intermediate member 12) can be given by the following simple expression (8). The expression (8) represents the natural frequency of the second torque transmission path P2 (the intermediate member 12) on the assumption that the drive member 11 and the driven member 15 do not rotate relative to each other. In this case, the resonance of the intermediate member 12 is hypothetical resonance that does not occur in the engine speed range in which the damper device 10 is used, and the engine speed corresponding to the natural frequency $f_{R1}$ of the intermediate member 12 is lower than the lockup engine speed Nlup of the lockup clutch 8.

[Formula 5]

$$f_{R1} = \frac{1}{2\pi} \sqrt{\frac{k_2 + k_3}{J_2}} \qquad (8)$$

As shown in FIG. 3, in the damper device 10 configured as described above, the subsequent resonance (e.g., the resonance of the entire damper device 10, see the resonance point R2 in FIG. 3) may occur before the engine speed increases so much after the anti-resonance point A is produced. It is therefore preferable to select and set the spring constant $k_1$, $k_2$, $k_3$ and the moment of inertia $J_2$ of the intermediate member 12 so that resonance that occurs at a higher engine speed (higher frequency) than the anti-resonance point A has a higher frequency. This allows this resonance (resonance point R2) to be caused in the high engine speed range in which vibration is less likely to be significant, and can further improve the vibration damping capability of the damper device 10 in the low engine speed range. In the damper device 10, even if the resonance (resonance point R2) occurs at a higher engine speed than the anti-resonance point A, the phase of the vibration in the first torque transmission path P1 and the phase of the vibration in the second torque transmission path P2 are the same as before occurrence of this resonance.

Moreover, in the damper device 10 configured as described above, in order to further improve the vibration damping capability at around the lockup engine speed Nlup, it is necessary to separate the lockup engine speed Nlup from the engine speed corresponding to the resonance point R2 as much as possible. Accordingly, when the damper device 10 is configured so as to satisfy the expression (7), it is preferable to select and set the spring constants $k_1$, $k_2$, $k_3$ and the moment of inertia $J_2$ so as to satisfy Nlup≤(120/n)·fa (=Nea). This allows the lockup operation to be performed by the lockup clutch 8 while satisfactorily restraining transmission of vibration to the input shaft IS of the transmission, and allows vibration from the engine to be very satisfactorily damped by the damper device 10 immediately after the lockup operation is performed.

In the damper device 10, an intermediate element, or a resonating element, is omitted from the first torque transmission path P1. This can further increase the frequency band (engine speed range) in which one of the vibration transmitted to the driven member 15 through the first springs SP1 and the vibration transmitted to the driven member 15 through the third springs SP3 cancels at least a part of the other after the resonance corresponding to the natural frequency of the second torque transmission path P2 (the intermediate member 12) occurs. Omitting the intermediate element from the first torque transmission path P1 can also simplify the overall structure of the device and can restrain an increase in overall size (especially an increase in overall axial length) of the device. Since the second and third springs SP2, SP3 in the second torque transmission path P2 are placed outside the first springs SP1 in the first torque transmission path P1 in the radial direction of the damper device 10, the natural frequency of the second torque transmission path P2 (the intermediate member 12) can further be reduced by adjusting the spring constants (rigidity) of the second and third springs SP2, SP3 and the moment of inertia $J_2$ of the intermediate member 12.

Moreover, when the damper device 10 is configured so as to satisfy the expression (7), the spring constant $k_1$ of the first springs SP1 can be made smaller than the spring constants $k_2$, $k_3$ of the second and third springs SP2, SP3. This can further reduce the overall rigidity of the damper device 10 and can further increase the maximum torsion angle θmax of the damper device 10. In the damper device 10, the intermediate member 12 is rotatably supported by the tubular portion (support portion) 111b of the drive member 11 so as to be located near the outer periphery of the damper device 10. This can further increase the moment of inertia of the intermediate member 12. In addition, coupling the intermediate member 12 to the turbine runner 5 so that the intermediate member 12 rotates with the turbine runner 5 can further increase the substantial moment of inertia $J_2$ of the intermediate member 12 (the sum of the moments of inertia of the intermediate member 12, the turbine runner 5, etc.). As can be seen from the expressions (6), (8), the natural frequency of the second torque transmission path P2 (the intermediate member 12) and the frequency fa at the anti-resonance point A can therefore be further reduced, and the anti-resonance point A can be set at a lower engine speed (lower frequency).

Designing the damper device 10 based on the frequency fa of the anti-resonance point A as described above can restrain an increase in overall size of the device and can further improve the vibration damping capability of the damper device 10. The research and analysis conducted by the inventors show that, in the case where the lockup engine speed Nlup is set to, e.g., around 1,000 rpm, practically very satisfactory results are obtained by configuring the damper device 10 so as to satisfy, e.g., 900 rpm≤(120/n)·fa≤1,200 rpm. The analysis conducted by the inventors also shows that practically very satisfactory vibration damping capability of the damper device 10 can be ensured by setting the ratios of the spring constants $k_1$, $k_2$, $k_3$ of the first to third springs SP1 to SP3 to the equivalent spring constant $k_{total}$ ($=k_1+(1/k_2+1/k_3)^{-1}$) of the damper device 10 so as to satisfy the following relationships.

$0.30 \le k_1/k_{total} \le 0.90$ $0.50 \le k_2/k_{total} \le 1.10$ $0.55 \le k_3/k_{total} \le 1.15$ Moreover, the drive member 11 has the spring contact portions 112c, 113c that contact the ends of the first springs SP1, and the spring contact portions 111c that contact the ends of the second springs SP2. The driven member 15 has the inner spring contact portions 15ci that contact the ends of the first springs SP1, and the outer spring contact portions 15co that contact the ends of the third springs SP3. The second and third springs SP2, SP3 in the second torque transmission path P2 can thus be placed outside the first springs SP1 in the first torque transmission path P1 in the radial direction of the damper device 10.

As shown in FIG. 2, in the above embodiment, the drive member 11 includes: the first plate member 111 that has the spring contact portions 111c contacting the ends of the second springs SP2 and that is coupled to the lockup piston 80 to which power from the internal combustion engine is transmitted; the second plate member 112 that has the spring contact portions 112c contacting the ends of the first springs SP1 and that is coupled to the first plate member 111 at a position between the first springs SP1 and the second and third springs SP2, SP3 in the radial direction so as to rotate with the first plate member 111; and the third plate member 113 that has the spring contact portions 113c contacting the ends of the first springs SP1 and that is coupled to the second plate member (112) so as to rotate therewith. In addition, the driven member 15 is placed between the second plate member 112 and the third plate member 113 in the axial direction of the damper device 10. This can restrain an increase in axial length of the damper device 10 and allows the second and third springs SP2, SP3 to be placed outside the first springs SP1 in the radial direction of the damper device 10.

As shown in FIG. 2, the joint portion (joint) between the lockup piston 80 and the first plate member 111 (the rivets fastening the lockup piston 80 and the first plate member 111 together) and the joint portion between the second plate member 112 and the third plate member 113 (the rivets fastening the second plate member 112 and the third plate member 113 together) are located between the first springs SP1 and the second and third springs SP2, SP3 in the radial direction. This can further reduce the axial length of the damper device 10. As shown in FIG. 2, in the above embodiment, the fixed portion between the turbine coupling member 55 and the turbine runner 5 is also located between the first springs SP1 and the second and third springs SP2, SP3 in the radial direction. This allows the intermediate member 12 and the turbine runner 5 to be coupled together while further reducing the axial length of the damper device 10.

In the above embodiment, the first springs SP1 have a larger outside diameter (coil diameter) than the second and third springs SP2, SP3. Since the first springs SP1 placed closer to the inner periphery have a larger outside diameter, the torsion angle of the first springs SP1 can be about the same as that of the second and third springs SP2, SP3 placed closer to the outer periphery. Moreover, torque can be satisfactorily allocated to the first torque transmission path P1 by increasing the wire diameter of the first springs SP1.

Figure 4:
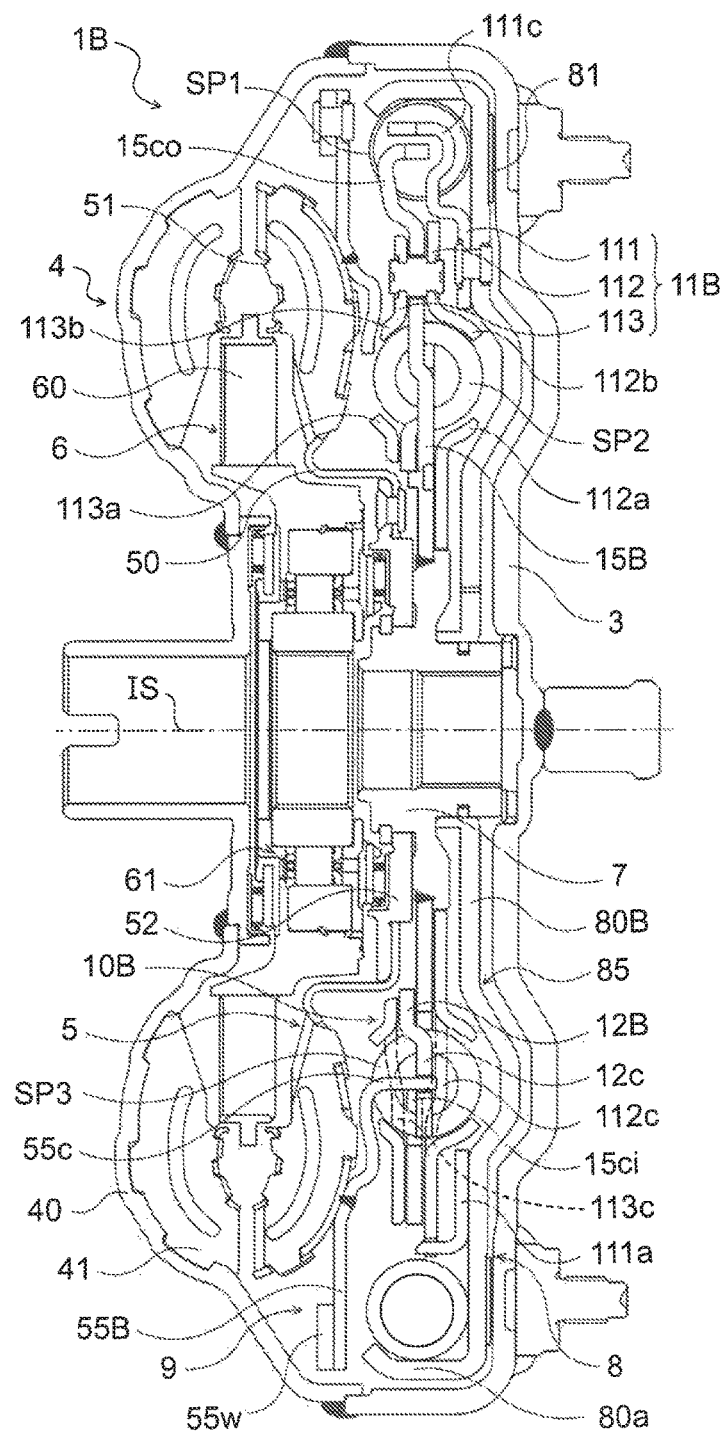
FIG. 4 is a sectional view showing a starting device according to another embodiment of the present disclosure.

FIG. 4 is a sectional view showing a starting device 1B including a damper device 10B according to another embodiment of the present disclosure. Of the components of the starting device 1B and the damper device 10B, the same components as those of the starting device 1 and the damper device 10 are denoted with the same reference characters, and description will not be repeated.

As shown in FIG. 4, in the damper device 10B of the starting device 1B, the second and third springs SP2, SP3 and an intermediate member 12B which are included in the second torque transmission path are placed radially inside the first springs SP1 included in the first torque transmission path P1. That is, in the damper device 10B, the second and third springs SP2, SP3 are supported by the spring support portions 112a, 112b of the second plate member 112 and the spring support portions 113a, 113b of the third plate member 113 of a drive member 11B such that the second springs SP2 are paired with the third springs SP3 and that the second and third springs SP2, SP3 are alternately arranged side by side in the circumferential direction. When the damper device 10B is in a mounted state, the spring contact portions 112c, 113c of the drive member 11B and the inner spring contact portion 15ci of a driven member 15B are located between the second and third springs SP2, SP3 (that are not paired) that are supported by the different spring support portions 112a, 112b, 113a, 113b, and contact the ends of these second and third springs SP2, SP3.

The intermediate member 12B is a plate-like annular member and is rotationally supported (aligned) by a plurality of axially extended portions of the inner peripheral part of the driven member 15B so as to be located radially inside the plurality of first springs SP1. Each spring contact portion 12c of the intermediate member 12 is located between the second and third springs SP2, SP3 that are paired and supported by the same spring support portions 112a, 112b, 113a, 113b, and contacts the ends of these second and third springs SP2, SP3. A turbine coupling member 55B fixed to the turbine shell 50 of the turbine runner 5 has the plurality of spring contact portions 55c formed at intervals in the circumferential direction so as to extend in the axial direction from the inner peripheral part of the turbine coupling member 55B. Each spring contact portion 55c is fitted in a slit formed in a corresponding one of the spring contact portions 12c of the intermediate member 12B. The intermediate member 12B and the turbine runner 5 are thus coupled so as to rotate together. Since the turbine runner 5 (and the turbine hub 52) is coupled to the intermediate member 12B, a substantial moment of inertia of the intermediate member 12B (the sum of the moments of inertia of the intermediate member 12B, the turbine runner 5, etc.) can further be increased. An additional weight (additional mass) 55w as shown in FIG. 4 may be attached to the turbine coupling member 55B in order to further increase the moment of inertia of the intermediate member 12B.

Moreover, in the starting device 1B, a lockup piston 80B has in its outer peripheral part an annular spring support portion 80a that supports (guides) the outer peripheral parts and the front cover 3 sides (the right sides in FIG. 4) of the plurality of first springs SP1 etc. As shown in FIG. 4, the plurality of first springs SP1 are supported by the spring support portion 80a of the lockup piston 80B so as to surround the second and third springs SP2, SP3 supported by the drive member 11B (the second and third plate members 112, 113), and are placed in the outer peripheral region of the hydraulic transmission chamber 9. When the damper device 10B is in the mounted state, each spring contact portion 111c of the drive member 11B (the first plate member 111) and each outer spring contact portion 15co of the driven member 15B are located between adjoining ones of the first springs SP1 and contact the ends of these adjoining first springs SP1.

The damper device 10B configured as described above has functions and effects similar to those of the damper device 10. In the damper device 10B, the rigidity of the first springs SP1 can further be reduced (the spring constant thereof can further be reduced). This can further reduce the overall rigidity of the device and can achieve a satisfactory maximum torsion angle θmax of the damper device 10B.

As described above, the damper device of the present disclosure is a damper device (10) including an input element (11) to which power from an internal combustion engine is transmitted and an output element (15). The damper device (10) includes: a first torque transmission path (P1) including a first elastic body (SP1) that transmits torque between the input element (11) and the output element (15); and a second torque transmission path (P2) disposed in parallel with the first torque transmission path (P1) and including an intermediate element (12), a second elastic body (SP2) that transmits the torque between the input element (11) and the intermediate element (12), and a third elastic body (SP3) that transmits the torque between the intermediate element (12) and the output element (15). The second and third elastic bodies (SP2, SP3) are placed outside the first elastic body (SP1) in a radial direction of the damper device (10) so as to be arranged side by side in a circumferential direction of the damper device (10).

In the damper device having such first and second torque transmission paths, an anti-resonance point can be set at which a vibration amplitude of the output element becomes theoretically zero when vibration transmitted to the output element through the first torque transmission path becomes 180 degrees out of phase with respect to that transmitted to the output element through the second torque transmission path due to occurrence of resonance corresponding to a natural frequency of the second torque transmission path (the intermediate element). Moreover, in this damper device, the intermediate element, or a resonating element, is omitted from the first torque transmission path. This can further increase a frequency band (engine speed range) in which one of the vibration transmitted to the output element through the first elastic body and the vibration transmitted to the output element through the third elastic body cancels at least a part of the other after the resonance corresponding to the natural frequency of the second torque transmission path (the intermediate element) occurs. Since the second and third elastic bodies of the second torque transmission path are placed outside the first elastic body of the first torque transmission path in the radial direction of the damper device, the natural frequency of the second torque transmission path (the intermediate element) can further be reduced by adjusting rigidity of the second and third elastic bodies and a moment of inertia of the intermediate element. This can further improve vibration damping capability of the damper device having the first and second torque transmission paths disposed in parallel. Moreover, in this damper device, the intermediate element is omitted from the first torque transmission path. This can simplify the overall structure of the device and can restrain an increase in overall size (especially an increase in overall axial length) of the device.

The intermediate element (12) may be coupled to a turbine runner (5) of a hydraulic transmission device so as to rotate therewith. This can further increase a substantial moment of inertia of the intermediate element (the sum of the moments of inertia of the intermediate element and the turbine runner), and therefore can further reduce the natural frequency of the second torque transmission path (the intermediate element) and the frequency fa at the anti-resonance point, so that the anti-resonance point can be set at a lower engine speed.

The intermediate element (12) may be rotatably supported by a support portion (111b) of the input element (11) so as to be located near an outer periphery of the damper device (10). This can further increase the moment of inertia of the intermediate element.

The input element (11) may have an inner contact portion (112c, 113c) contacting an end of the first elastic body (SP1), and an outer contact portion (111c) contacting an end of the second elastic body (SP2). The output element (15) may have an inner contact portion (15ci) contacting the end of the first elastic body (SP1), and an outer contact portion (15co) contacting an end of the third elastic body (SP3). This allows the second and third elastic bodies of the second torque transmission path to be placed outside the first elastic body of the first torque transmission path in the radial direction of the damper device.

The input element (11) may include a first input member (111) that has the outer contact portion (111c) contacting the end of the second elastic body (SP2) and that is coupled to a power input member (80) to which the power from the internal combustion engine is transmitted, a second input member (112) that has the inner contact portion (112c) contacting the end of the first elastic body (SP1) and that is coupled to the first input member (111) at a position between the first elastic body (SP1) and the second and third elastic bodies (SP2, SP3) in the radial direction so as to rotate with the first input member (111), and a third input member (113) that has the inner contact portion (113c) contacting the end of the first elastic body (SP1) and that is coupled to the second input member (112) so as to rotate therewith. The output element (15) may be placed between the second input member (112) and the third input member (113) in an axial direction of the damper device (10). This can restrain an increase in axial length of the damper device and allows the second and third elastic bodies to be placed outside the first elastic body in the radial direction of the damper device.

A joint portion between the power input member (80) and the first input member (111) and a joint portion between the second input member (112) and the third input member (113) may be located between the first elastic body (SP1) and the second and third elastic bodies (SP2, SP3) in the radial direction. This can further reduce the axial length of the damper device.

The damper device (10) may further include: a turbine coupling member (55) that is fixed to the turbine runner (5) of the hydraulic transmission device and that couples the intermediate element (12) and the turbine runner (5) so that the intermediate element (12) and the turbine runner (5) rotate together. A fixed portion between the turbine coupling member (55) and the turbine runner (5) may be located between the first elastic body (SP1) and the second and third elastic bodies (SP2, SP3) in the radial direction. This allows the d intermediate member and the turbine runner to be coupled together while further reducing the axial length of the damper device.

The first to third elastic bodies (SP1, SP2, SP3) may be coil springs, and the first elastic body (SP1) may have a larger outside diameter than the second and third elastic bodies (SP2, SP3). Since the first elastic body (SP1) placed closer to the inner periphery have a larger outside diameter, the torsion angle of the first elastic body (SP1) can be about the same as that of the second and third elastic bodies placed closer to the outer periphery. Moreover, torque can be satisfactorily allocated to the first torque transmission path by increasing the wire diameter of the first elastic body.

The first elastic body (SP1) may have a smaller spring constant than the second and third elastic bodies (SP2, SP3). This can further reduce the overall rigidity of the damper device and can further increase the torsion angle of the damper device.

Another damper device of the present disclosure is a damper device (10) including an input element (11) to which power from an internal combustion engine is transmitted and an output element (15). The damper device (10) includes: a first torque transmission path (P1) including a first elastic body (SP1) that transmits torque between the input element (11) and the output element (15); and a second torque transmission path (P2) disposed in parallel with the first torque transmission path (P1) and including an intermediate element (12), a second elastic body (SP2) that transmits the torque between the input element (11) and the intermediate element (12), and a third elastic body (SP3) that transmits the torque between the intermediate element (12) and the output element (15). Spring constants of the first, second, and third elastic bodies (SP1, SP2, SP3) and a moment of inertia of the intermediate element (12) are determined based on a frequency (fa) at an anti-resonance point (A) at which a vibration amplitude of the output element (15) is theoretically zero. Since the damper device is thus configured based on the frequency at the anti-resonance point at which the vibration amplitude of the output element can further be reduced, vibration damping capability of the damper device having the first and second torque transmission paths disposed in parallel can further be improved.

The spring constants of the first, second, and third elastic bodies (SP1, SP2, SP3) and the moment of inertia of the intermediate element (11) may be determined based on the frequency (fa) at the anti-resonance point (A) and the number of cylinders (n) of the internal combustion engine.

The damper device (10) may be configured so as to satisfy 500 rpm≤(120/n)·fa≤1,500 rpm, where "fa" represents the frequency at the anti-resonance point (A) and "n" represents the number of cylinders of the internal combustion engine.

The anti-resonance point at which the vibration amplitude of the output element can further be reduced is thus set in the low engine speed range of 500 rpm to 1,500 rpm. This allows the internal combustion engine to be coupled to the input element at a lower engine speed, and can improve vibration damping capability of the damper device in the low engine speed range in which vibration from the internal combustion engine tends to be large. By configuring the damper device so that the frequency of the resonance that produces the anti-resonance point (the resonance that just has to be caused in order to form the anti-resonance point A) is lower than the frequency fa of the anti-resonance point and is as low as possible, the frequency fa of the anti-resonance point can further be reduced, and the internal combustion engine is allowed to be coupled to the input element at a much lower engine speed. By configuring the damper device so that the frequency of resonance that occurs at a higher engine speed (higher frequency) than the anti-resonance point has a higher frequency, this resonance can be caused in the high engine speed range in which vibration is less likely to be significant, and vibration damping capability of the damper device in the low engine speed range can further be improved.

The damper device (10) may be configured so as to satisfy Nlup≤(120/n)·fa, where "fa" represents the frequency at the anti-resonance point and "Nlup" represents a lockup engine speed of a lockup clutch (8) that couples the internal combustion engine to the input element (11). This allows vibration from the internal combustion engine to be very satisfactorily damped by the damper device when and immediately after the internal combustion engine is coupled to the input element by the lockup clutch.

The damper device (10) may be configured so as to satisfy 900 rpm≤(120/n)·fa≤1,200 rpm.

The frequency fa at the anti-resonance point (A) may be given by the above expression (6).

The damper device (10) may be configured so that deflection of the first to third elastic bodies (SP1, SP2, SP3) is not restricted until input torque (T) transmitted from the internal combustion engine to the input element (11) becomes equal to or larger than a predetermined threshold (T1).

It should be understood that the disclosure of the present disclosure is not limited in any way to the above embodiments, and various modifications can be made without departing from the spirit and scope of the present disclosure. The above modes for carrying out the disclosure are merely shown as specific forms of the disclosure described in "SUMMARY" and are not intended to limit the elements of the disclosure described in "SUMMARY."

INDUSTRIAL APPLICABILITY

The disclosure of the present disclosure is applicable to manufacturing fields of damper devices etc.

The invention claimed is:

1. A damper device including an input to which torque from an internal combustion engine is transmitted and an output, the damper device comprising:
   a first torque transmission path including a first elastic body that transmits the torque between the input and the output; and
   a second torque transmission path disposed in parallel with the first torque transmission path and including an intermediate element, a second elastic body that transmits the torque between the input and the intermediate element, and a third elastic body that transmits the torque between the intermediate element and the output, wherein
   the second and third elastic bodies are placed outside the first elastic body in a radial direction of the damper device so as to be arranged side by side in a circumferential direction of the damper device,
   when the torque is transmitted from the internal combustion engine to the input, the torque is always transmitted between the input and the output via both the first torque transmission path and the second torque transmission path, and
   the intermediate element is formed so as to cover the second elastic body and the third elastic body from outside in the radial direction and support outer peripheral parts of the second elastic body and the third elastic body.

2. The damper device according to claim 1, wherein the intermediate element is coupled to a turbine runner of a hydraulic transmission device so as to rotate therewith.

3. The damper device according to claim 1, wherein the intermediate element is rotatably supported by a support of the input so as to be located near an outer periphery of the damper device.

4. The damper device according to claim 1, wherein the input has an inner contact contacting an end of the first elastic body, and an outer contact contacting an end of the second elastic body, and
the output has an inner contact contacting the end of the first elastic body, and an outer contact contacting an end of the third elastic body.

5. The damper device according to claim 4, wherein the input includes a first input that has the outer contact contacting the end of the second elastic body and that is coupled to a power input to which the power from the internal combustion engine is transmitted, a second input that has the inner contact contacting the end of the first elastic body and that is coupled to the first input at a position between the first elastic body and the second and third elastic bodies in the radial direction so as to rotate with the first input, and a third input that has the inner contact contacting the end of the first elastic body and that is coupled to the second input so as to rotate therewith, and
the output is placed between the second input and the third input in an axial direction of the damper device.

6. The damper device according to claim 5, wherein a joint between the power input and the first input and a joint between the second input and the third input are located between the first elastic body and the second and third elastic bodies in the radial direction.

7. The damper device according to claim 6, further comprising:
- a turbine coupler that is fixed to a turbine runner of a hydraulic transmission device and that couples the intermediate element and the turbine runner so that the intermediate element and the turbine runner rotate together, wherein
- a fixed portion between the turbine coupler and the turbine runner is located between the first elastic body and the second and third elastic bodies in the radial direction.

8. The damper device according to claim 1, wherein
the first to third elastic bodies are coil springs, and
the first elastic body has a larger outside diameter than the second and third elastic bodies.

9. The damper device according to claim 1, wherein
the first elastic body has a smaller spring constant than the second and third elastic bodies.

10. The damper device according to claim 2, wherein
the intermediate element is rotatably supported by a support of the input so as to be located near an outer periphery of the damper device.

11. The damper device according to claim 10, wherein
the input has an inner contact contacting an end of the first elastic body, and an outer contact contacting an end of the second elastic body, and
the output has an inner contact contacting the end of the first elastic body, and an outer contact contacting an end of the third elastic body.

12. The damper device according to claim 11, wherein
the input includes a first input that has the outer contact contacting the end of the second elastic body and that is coupled to a power input to which the power from the internal combustion engine is transmitted, a second input that has the inner contact contacting the end of the first elastic body and that is coupled to the first input at a position between the first elastic body and the second and third elastic bodies in the radial direction so as to rotate with the first input, and a third input that has the inner contact contacting the end of the first elastic body and that is coupled to the second input so as to rotate therewith, and
the output is placed between the second input and the third input in an axial direction of the damper device.

* * * * *